United States Patent
Bianchi et al.

(10) Patent No.: US 9,302,764 B2
(45) Date of Patent: Apr. 5, 2016

(54) BLADE AND METHOD OF FABRICATING SAID BLADE

(75) Inventors: Laurent Bianchi, Marseilles (FR); Nicolas Isidore, Les Milles (FR); Jacques Gaffiero, Paris (FR); Bernard Michel, Peyrolles En Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 800 days.

(21) Appl. No.: 13/355,728

(22) Filed: Jan. 23, 2012

(65) Prior Publication Data

US 2012/0195762 A1    Aug. 2, 2012

(30) Foreign Application Priority Data

Jan. 31, 2011    (FR) ..................... 11 00289

(51) Int. Cl.
*B64C 11/26* (2006.01)
*B64C 27/48* (2006.01)

(52) U.S. Cl.
CPC ................. *B64C 11/26* (2013.01); *B64C 27/48* (2013.01)

(58) Field of Classification Search
CPC ...... B64C 27/48; B64C 27/473; B64C 11/26; B64C 11/20
USPC .......... 416/205, 219 R, 225, 226, 229 R, 239, 416/240, 241 R, 248
See application file for complete search history.

(56) References Cited

U.S. PATENT DOCUMENTS

| | | |
|---|---|---|
| 512,782 A | 1/1894 | Wickey |
| 3,664,764 A | 5/1972 | Davis |
| 3,754,840 A | 8/1973 | Zincone |
| 3,883,267 A | 5/1975 | Baudier |
| 3,923,422 A * | 12/1975 | Ianniello et al. .............. 416/226 |
| 4,047,840 A | 9/1977 | Ravenhall |
| 4,302,155 A | 11/1981 | Grimes |
| 4,407,635 A | 10/1983 | Grimes |
| 4,643,647 A | 2/1987 | Perry |

(Continued)

FOREIGN PATENT DOCUMENTS

| | | |
|---|---|---|
| CA | 401168 A | 2/1941 |
| CA | 1321735 C | 8/1993 |

(Continued)

OTHER PUBLICATIONS

Search Report and Written Opinion; Application No. FR 1100289; dated Aug. 30, 2011.

*Primary Examiner* — Richard Edgar
*Assistant Examiner* — Juan G Flores
(74) *Attorney, Agent, or Firm* — Brooks Kushman P.C.

(57) ABSTRACT

A blade (1) provided with a fitting (2) for fastening to a hub and with an airfoil element (10) having a spar (20) extending spanwise from an attachment zone (21) towards a distal zone (22), said attachment zone (21) surrounding a centrifugal force transmission bushing (31) that is connected to said fitting (2) by a through pin (3). The blade comprises a twisting force transmission member (40) provided with a first half-shell (41) and with a second half-shell (42) that together surround said attachment zone (21), each half-shell (41, 42) having a perforated first portion (43', 43") giving visual access to said bushing (31) when said airfoil element is removed from the fitting, and a second portion (44', 44") co-operating with a torsion box (50) surrounding said distal zone (22), said transmission member (40) being secured to said fitting in rotation about a torsion axis (AX) of the blade (1).

20 Claims, 4 Drawing Sheets

(56) References Cited

U.S. PATENT DOCUMENTS

| | | | |
|---|---|---|---|
| 4,664,600 A | 5/1987 | Perry | |
| 4,685,864 A | 8/1987 | Angus | |
| 4,696,623 A * | 9/1987 | Bost | 416/230 |
| 4,762,466 A | 8/1988 | Bouiller | |
| 4,921,403 A | 5/1990 | Poucher | |
| 4,966,527 A | 10/1990 | Merz | |
| 5,017,092 A | 5/1991 | Violette | |
| 5,022,824 A | 6/1991 | Violette | |
| 5,022,825 A | 6/1991 | Violette | |
| 5,042,968 A | 8/1991 | Fecto | |
| 5,102,300 A | 4/1992 | Violette | |
| 5,127,802 A | 7/1992 | Carlson | |
| 5,129,787 A * | 7/1992 | Violette et al. | 416/226 |
| 5,163,817 A | 11/1992 | Violette | |
| 5,222,297 A | 6/1993 | Graff | |
| 5,240,377 A | 8/1993 | Farr | |
| 5,269,658 A | 12/1993 | Carlson | |
| 5,292,231 A | 3/1994 | Lauzeille | |
| 5,308,228 A | 5/1994 | Benoit | |
| 5,382,150 A | 1/1995 | Henrio | |
| 5,672,417 A | 9/1997 | Champenois | |
| 6,213,719 B1 | 4/2001 | Violette | |
| 6,305,905 B1 | 10/2001 | Nagle | |
| 7,503,750 B1 | 3/2009 | Violette | |
| 8,137,073 B2 | 3/2012 | Giusti | |
| 2002/0008177 A1 | 1/2002 | Violette | |
| 2003/0156944 A1 | 8/2003 | Rust | |
| 2005/0084379 A1 | 4/2005 | Schreiber | |
| 2006/0140772 A1 | 6/2006 | McMillan | |
| 2006/0257260 A1 | 11/2006 | Dambrine | |
| 2007/0092379 A1 | 4/2007 | Coupe | |
| 2008/0075602 A1 | 3/2008 | Hill | |
| 2008/0113179 A1 | 5/2008 | Schreiber | |
| 2008/0187441 A1 | 8/2008 | Schreiber | |
| 2009/0004008 A1 | 1/2009 | Richards | |
| 2009/0035131 A1 | 2/2009 | McMillan | |
| 2009/0074586 A1 | 3/2009 | Le Hong | |
| 2010/0054945 A1 | 3/2010 | McMillan | |
| 2010/0104443 A1 | 4/2010 | Pentony | |
| 2011/0293435 A1 | 12/2011 | McMillan | |

FOREIGN PATENT DOCUMENTS

| | | | |
|---|---|---|---|
| CZ | 1302 | U1 | 4/1994 |
| DE | 9114658 | U1 | 4/1992 |
| EP | 0362886 | A2 | 4/1992 |
| EP | 1484475 | A2 | 12/2004 |
| EP | 1669547 | A2 | 6/2006 |
| EP | 2159378 | A2 | 3/2010 |
| FR | 2195255 | A5 | 3/1974 |
| FR | 2312673 | A1 | 12/1976 |
| FR | 2605586 | A1 | 4/1988 |
| FR | 2639021 | A1 | 5/1990 |
| FR | 2682992 | A1 | 4/1993 |
| FR | 2683764 | A1 | 5/1993 |
| FR | 2685249 | A1 | 6/1993 |
| FR | 2685732 | A1 | 7/1993 |
| FR | 2684719 | B1 | 2/1994 |
| FR | 2718101 | A1 | 10/1995 |
| FR | 2732406 | A1 | 10/1996 |
| FR | 2906320 | A1 | 3/2008 |
| FR | 2921099 | A1 | 3/2009 |
| GB | 1319235 | A | 6/1973 |
| GB | 2237532 | A | 5/1991 |
| GB | 2244525 | A | 12/1991 |
| GB | 2440345 | A | 1/2008 |
| GB | 2443482 | A | 5/2008 |
| GB | 2449058 | A | 11/2008 |
| RU | 2001828 | C1 | 10/1993 |
| RU | 2040432 | C | 7/1995 |
| RU | 2142895 | C1 | 12/1995 |
| RU | 2058249 | C1 | 4/1996 |
| RU | 2058250 | C1 | 4/1996 |
| RU | 2058251 | C | 4/1996 |
| RU | 2099188 | C1 | 12/1997 |
| SU | 1775974 | A1 | 11/1996 |
| WO | 9214646 | A1 | 9/1992 |
| WO | 9308017 | A1 | 4/1993 |
| WO | 0066429 | A1 | 11/2000 |

* cited by examiner

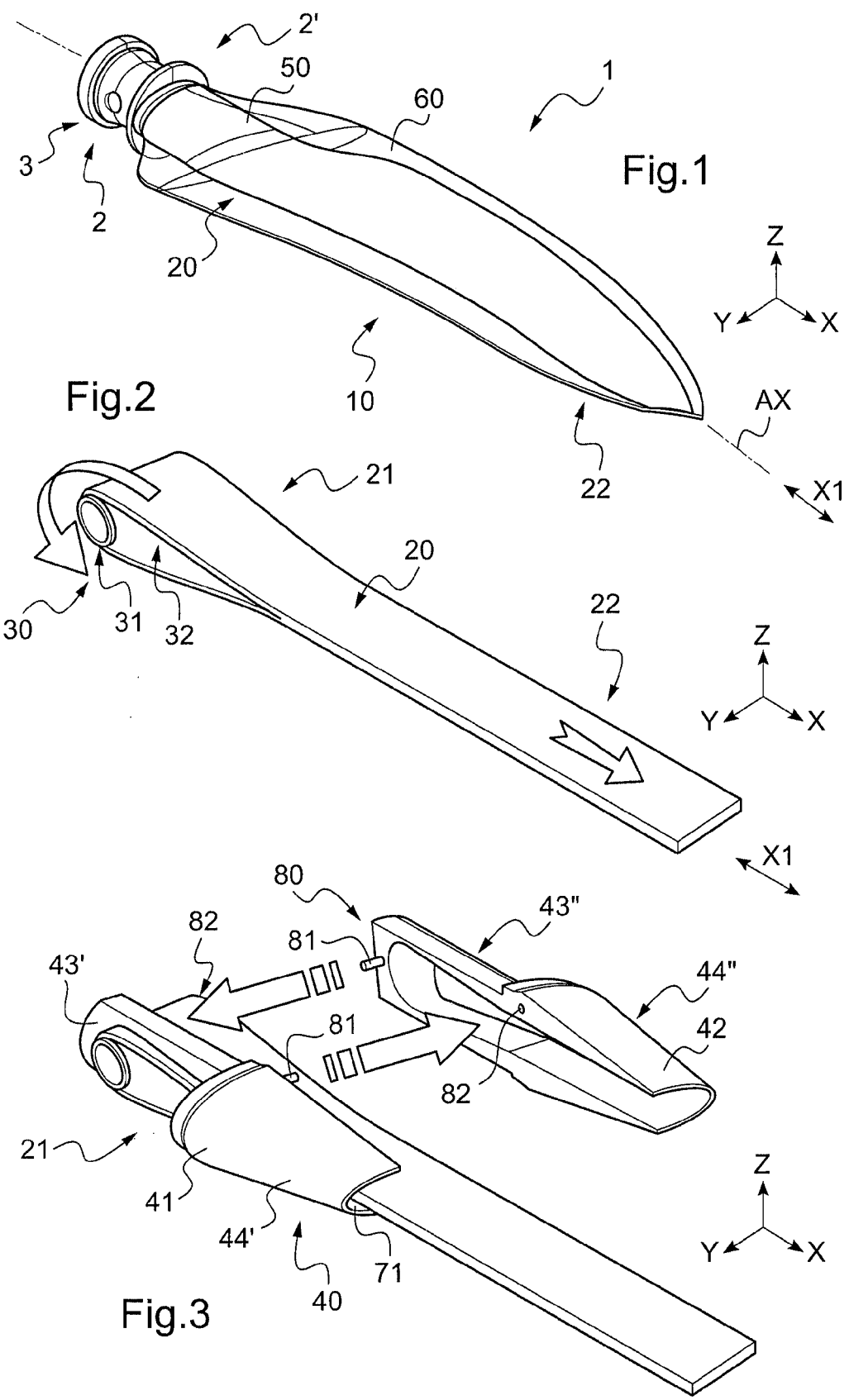

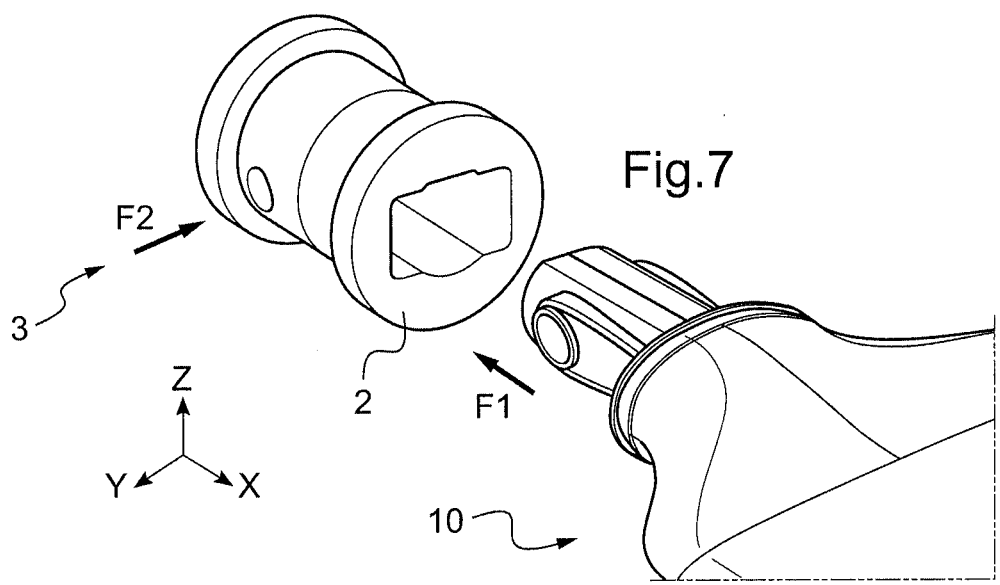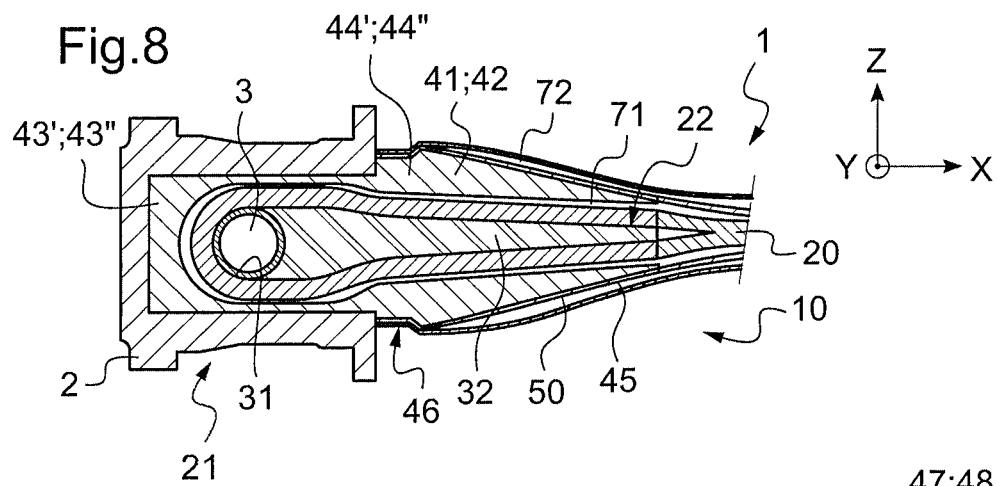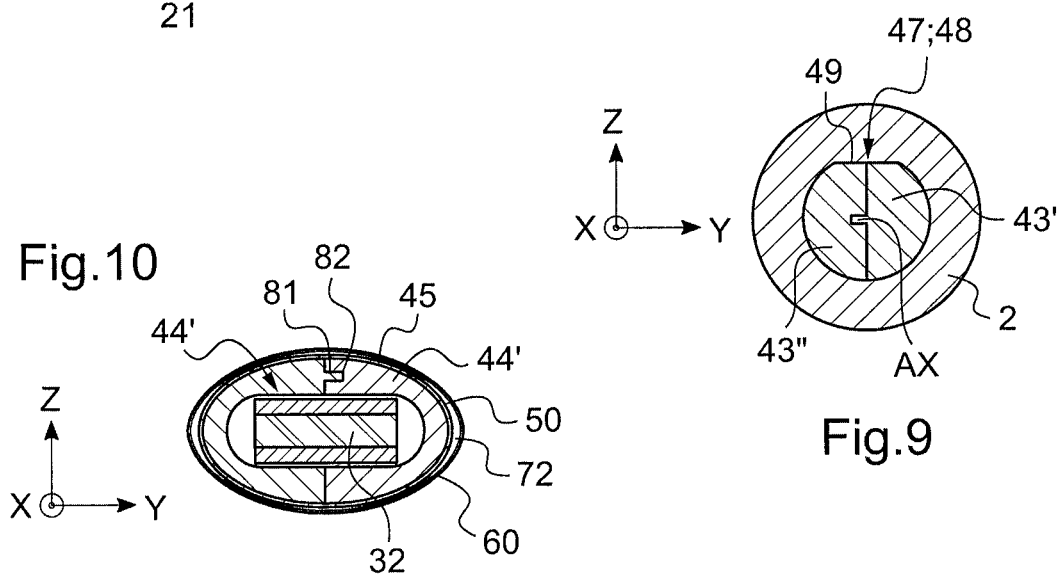

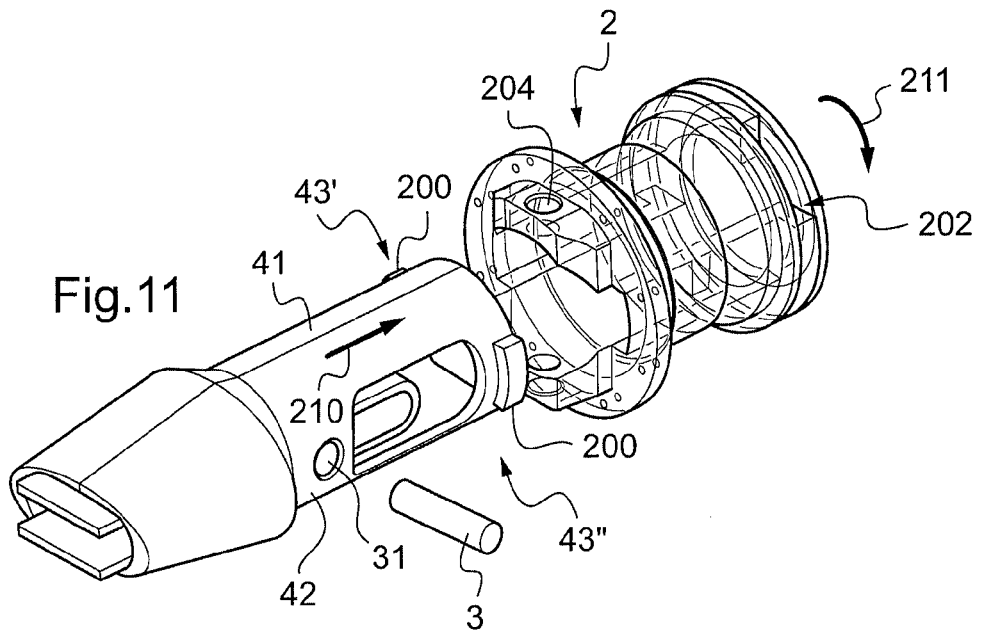
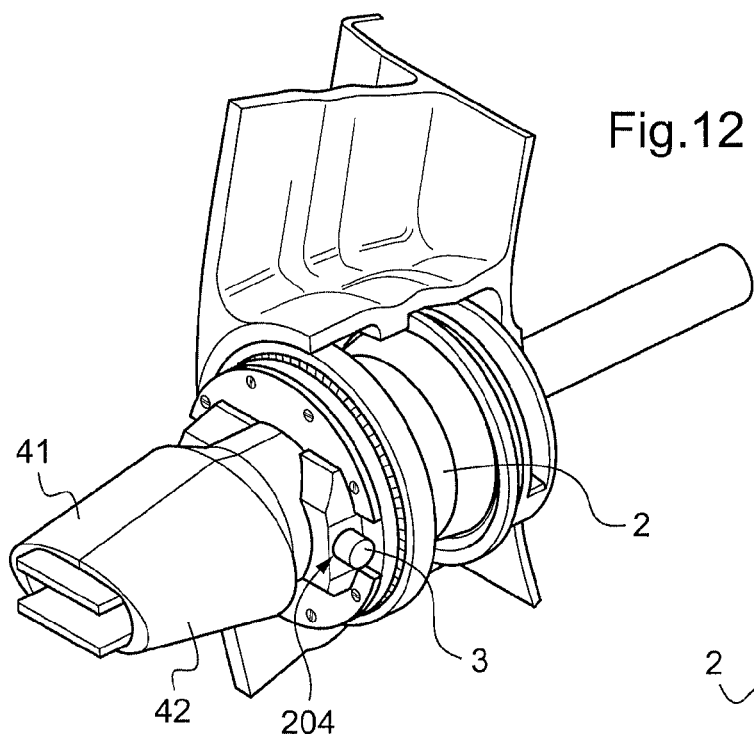
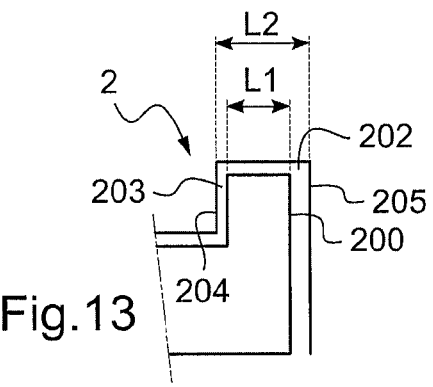

BLADE AND METHOD OF FABRICATING SAID BLADE

CROSS REFERENCE TO RELATED APPLICATIONS

This application claims priority to French patent application no. FR 11 00289 filed on Jan. 31, 2011, the disclosure of which is incorporated in its entirety by reference herein.

BACKGROUND OF THE INVENTION (1) Field of the Invention

The present invention relates to a blade and to a method of fabricating the blade.

(2) Description of Related Art

During its rotary motion, a blade is subjected to a torsor of forces and is consequently subjected to a centrifugal force and also to multiple forces due to flapping, drag, and twisting movements, where twisting is caused in particular by the changes of pitch that seek to modify the angle of inclination of the blade relative to the plane of the hub supporting the blade. Such forces naturally generate bending and twisting moments.

The forces and the moments to which the blade is subjected due in particular to centrifugal force and to twisting then need to be transmitted by the blade to the hub.

The means for fastening the blade to the hub are then subjected to forces and moments that can be destructive, with the term "force" being used below to designate both forces and moments for reasons of simplification. Furthermore, it can be understood that it can be difficult to inspect a blade in order to see any potential damage. In addition, it is advantageous to optimize the fastener means in order to limit their weight and reduce the aerodynamic drag they generate in flight.

The technological background for blades, and in particular for propeller blades, includes numerous documents, and for example the following documents: RU 2 040 432 C1, RU 2 058 249 C1, RU 2 058 250 C1, RU 2 058 251 C1, GB 2 244 525, CA 1 321 735, GB 1 319 235, FR 2 312 673 A1, FR 2 639 021 A1, GB 2 443 482, GB 2 449 058 A, US 2008/075602 A1, U.S. Pat. No. 4,643,647 A, U.S. Pat. No. 4,664,600 A, U.S. Pat. No. 4,685,864 A, EP 1 484 475 A2, EP 1 669 547 A2, GB 2 440 345 A, US 2009/004008 A1, US 2009/035131 A1, EP 2 159 378 A2, FR 2 195 255 A, FR 2 605 586 A1, FR 2 682 992 A1, FR 2 683 764 A1, FR 2 684 719 A1, FR 2 685 249 A1, FR 2 685 732 A1, FR 2 732 406 A1, FR 2 906 320 A1, US 2006/257260 A1, FR 2 921 099 A1, US 2007/092379 A1, U.S. Pat. No. 5,022,824 A, U.S. Pat. No. 5,022,825 A, EP 0 362 886 A2, U.S. Pat. No. 5,017,092 A, GB 2 237 532 A, U.S. Pat. No. 5,127,802 A, U.S. Pat. No. 5,269,658 A, WO 93/08017 A1, WO 92/14646 A1, U.S. Pat. No. 5,163,817 A, WO 00/66429 A1, U.S. Pat. No. 6,213,719 B1, U.S. Pat. No. 4,302,155 A, U.S. Pat. No. 4,407,635 A, CA 401 168 A, U.S. Pat. No. 4,966,527 A, RU 2 001 828 C1, U.S. Pat. No. 5,240, 377 A, CZ 1302 U1, FR 2 718 101 A1, RU 2 142 895 C1, SU 1 775 974 A1, RU 2 099 188 C1, US 2002/008177 A1, US 2003/156944 A1, US 2006/140772 A1, US 2008/187441 A1, US 2008/113179 A1, U.S. Pat. No. 7,503,750.

For example, document WO 93/08017 presents a blade provided with a spar subassembly having a metal retaining element and a cellular structure around which structural fibers are braided.

Document U.S. Pat. No. 4,302,155 presents a blade provided with a metal base pierced in its center to receive a pilot tube. The base includes a cylindrical portion and a cup-shaped portion defining a cavity, with foam extending from the cavity.

The foam and the base are then covered in fabric forming a rigid skin.

Furthermore, the blade includes collars for fastening to a hub that surrounds the rigid skin and the base.

The following documents are also known: DE 9114658, U.S. Pat. No. 3,754,840, and U.S. Pat. No. 5,222,297.

All of the forces to which the blade is subjected appear to pass via the base, it being difficult to look at that base because of the presence of the rigid skin.

BRIEF SUMMARY OF THE INVENTION

A particular object of the present invention is thus to provide a blade in which the zone for connection to a hub can be viewed and possibly also presents optimized strength.

According to the invention, a blade is provided with a fitting for fastening to a hub and with an airfoil element provided with a spar extending spanwise from an attachment zone towards a distal zone, the attachment zone surrounding a bushing for transmitting centrifugal forces to which the blade is subjected, the bushing being connected to the fitting by a through pin.

Furthermore, the blade is remarkable in particular in that it includes a twisting force transmission member provided with a first half-shell and with a second half-shell that together surround the attachment zone, each half-shell having a perforated first portion giving visual access to the bushing when the airfoil element is removed from the fitting, and a second portion co-operating with a torsion box surrounding the distal zone, said transmission member being secured to the fitting in rotation about a torsion axis of the blade.

Thus, when the blade is fastened to a hub in rotation via its fastener fitting, the forces to which the airfoil element of the blade are subjected during rotation are transmitted to the fastener fitting of the blade, said fitting transferring said forces to the hub.

More precisely, the centrifugal forces are taken up by the fitting via the bushing that is held by the spar, whereas the twisting forces are taken up by the fitting via the transmission member that co-operates with the torsion box. Thus, since the transmission member is distinct from the bushing, the blade possesses a path for centrifugal forces that is different from a path for twisting forces for the purposes of optimizing tolerance to damage.

In addition, the various paths are easily viewed for maintenance purposes, and the airfoil element may be withdrawn from the fitting in order to look at the bushing and the transmission member. The force concentration zones that might be damaged in fabrication or during use of the blade are thus easily accessible in order to be inspected.

Finally, the blade is very compact, giving rise to good aerodynamic drag in flight.

Furthermore, the blade may include one or more of the following characteristics.

For example, the torsion box is placed around the distal zone of the spar, with a covering that covers the torsion box.

Filler means may be arranged between the torsion box and the covering, such as a mean provided with one or more pieces of filling foam.

Similarly, a filler member may be arranged between the transmission member and the spar, such as means provided with one or more pieces of filling foam.

Furthermore, the second portion of the first half-shell and the second portion of the second half-shell act together to form a frustoconical surface in contact with the torsion box.

For example, the frustoconical surface has elliptical sections, said frustoconical surface being defined by a generator line having a point that describes an ellipse.

The frustoconical shape of the transmission member serves to obtain a torsion box of frustoconical shape at its root so as to encourage adhesion of the outer covering on said root of the torsion box.

According to another aspect, the first portion of the first half-shell and the second portion of the second half-shell together form a cylinder secured in rotation with the fitting.

Furthermore, the first portion of the first half-shell and the first portion of the second half-shell optionally act together to form a contact surface secured in rotation with the fitting by stop means.

The stop means may comprise mechanical means such as a peg or a flat of said contact surface.

It should also be observed that the first half-shell and the second half-shell may be symmetrical.

Furthermore, the blade may include assembly means for assembling the first half-shell to the second half-shell in order to enhance fastening the transmission member. For example, the assembly means may include at least one positioning peg of one of the half-shells co-operating with an orifice of the other half-shell.

In another aspect, the spar is made of composite materials and thus comprises fibers extending in a longitudinal direction of the blade, said torsion box being made of composite materials, including fibers extending in a direction that presents an acute angle relative to said longitudinal direction such as an angle of plus or minus 45 degrees, for example.

In a variant, the first portion of the first half-shell and the first portion of the second half-shell includes a fastener stud, the fitting having one longitudinal slideway and one circularly arcuate slideway per stud, each longitudinal slideway opening out into a circularly arcuate slideway.

Consequently, while inserting the airfoil element in the fitting, each stud is made to coincide with a longitudinal slideway. When the studs reach the associated circularly arcuate slideways, the fitting is turned through an angle of 45 degrees, for example, in order to put each end of the bushing in the airfoil element into coincidence with a hole in the fitting so as to be able to insert a through pin therein.

This variant presents the additional advantage of possessing a bayonet device suitable for holding the airfoil element in the fitting in the event of the through pin being accidentally broken.

Optionally, each stud extends in a longitudinal direction over a predetermined length, and each circularly arcuate slideway extends longitudinally over a length that is longer than said predetermined length in order to present clearance when said stud is inserted in said circularly arcuate slideway.

Under such circumstances, in the event of a through pin breaking, each stud comes into abutment against retaining faces of the associated longitudinal slideway. This results in a small amount of unbalance that can be detected by appropriate sensors and can thus be signaled to an operator for maintenance purposes.

In addition to a blade, the invention provides a method of fabricating the blade. According to the invention, the method comprises the steps of:

fabricating for example by draping a spar extending from an attachment zone towards a distal zone, the attachment zone surrounding a bushing, and then pre-polymerizing the spar;

arranging a twisting force transmission member provided with a first half-shell and a second half-shell on the attachment zone, each half-shell comprising a perforated first portion giving access to the bushing, and a second portion, a filler member optionally being inserted between the transmission member and the spar;

fabricating a torsion box by winding or draping around the second portion of each half-shell and the distal zone of the spar;

fabricating an outer covering by winding or draping around the torsion box, filler means optionally being inserted between the torsion box and the outer covering, and then polymerizing the assembly comprising the spar, the transmission member, the torsion box, and the outer covering in order to obtain an airfoil element; and inserting the airfoil element in a fitting and connecting the fitting to the bushing by a through pin.

DETAILED DESCRIPTION OF THE SEVERAL VIEWS OF THE DRAWINGS

The invention and its advantages appear in greater detail from the following description of embodiments given by way of illustration and with reference to the accompanying figures, in which:

FIG. 1 is a view showing a blade of the invention;

FIGS. 2 to 7 are views for explaining the method of fabricating a blade of the invention;

FIGS. 8 to 10 are sections through said blade; and

FIGS. 11 to 13 are diagrams showing a variant of the blade of the invention.

Figure 4:
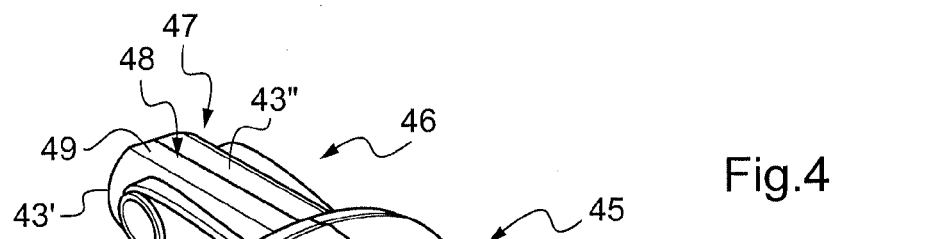

Three mutually orthogonal directions X, Y, and Z are shown in the figures.

DETAILED DESCRIPTION OF THE INVENTION

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "in elevation" relates to any direction parallel to the third direction Z.

FIG. 1 shows a blade 1 comprising an airfoil element 10 and a fitting 2 for fastening the airfoil element 10 to a hub, e.g. a propeller hub. The fitting 2 may also include means for controlling the pitch of the airfoil element (not shown in the figures for convenience).

The airfoil element comprises a spar 20 (not visible in FIG. 1) for taking up at least a portion of the centrifugal forces to which the blade 1 is subjected during its rotation about an axis of rotation. The spar 20 may be made of composite material, and it may extend from an attachment zone 21 surrounding a bushing that co-operates with the fitting 2 via a through pin 3 towards a distal zone 22.

The spar 20 also co-operates with a twisting force transmission member associated with a torsion box 50, the outer covering 60 of the blade 1 being placed around the torsion box 50.

Thus, the blade 1 includes main transmission means for transmitting centrifugal forces, the bushing about which the attachment zone of the spar is wound, and a main transmission member for transmitting twisting forces that is distinct from said main transmission means.

The centrifugal and twisting forces thus pass mainly to the fitting 2 via two distinct paths.

FIGS. 2 to 7 show details of a preferred method of making the blade 1, and from them it can be seen that the blade can be made easily while guaranteeing visual access to the zones subjected to high levels of stress in use.

With reference to FIG. 2, a spar 20 extending from an attachment zone 21 towards a distal zone 22 is made. The attachment zone 21 is in particular wound around centrifugal force transmission means that include at least one bushing 31 and possibly also at least one foam filling 32.

Advantageously, the spar 20 is a composite material spar having fibers that extend from the attachment zone 21 towards the distal zone 22 in a longitudinal direction X1, i.e. along the span of the blade that is to be made in order to take up the centrifugal forces exerted on the blade.

It is thus possible to drape the fibers while taking care to wind them around the transmission means and in particular around the bushing 31 using conventional methods, after which the assembly of the spar and the transmission means is pre-polymerized.

It should be observed that said assembly may then be inspected visually in order to verify that it has no defects.

At this stage, a twisting force transmission member 40 is then arranged on the attachment zone 21 of the spar 20. This transmission member 40 has a first half-shell 41 and a second half-shell 42 that are engaged transversely on the attachment zone 21 and then assembled to each other by reversible assembly means 80.

For example, the assembly means 80 possess at least one positioning peg 81 projecting from one of the half-shells in order to co-operate with a positioning orifice 82 in the other half-shell 1.

In another aspect, a filler member 71 is optionally housed between the spar 20 and the transmission member 40.

Each half-shell 41, 42 then comprises firstly a first portion 43', 43" that is pierced transversely to provide visual access to the bushing 31 or to the attachment zone of the spar, and secondly with a second portion 44', 44" having the function of being connected to a torsion box.

It should be observed that each half-shell may be constituted by a single block of metal, for example, or indeed it may comprise a plurality of parts that are fastened together.

With reference to FIG. 4, the first portion 43' of the first half-shell 41 and the first portion 43" of the second half-shell 42 optionally act together to form a cylinder 46 suitable for being secured in rotation with a fastener fitting 2.

The first portion 43' of the first half-shell 41 and said first portion 43" of the second half-shell 42 act together to form a contact surface 47 suitable for being secured in rotation to a fitting 2 by stop means 48 such as a flat 49 of said contact surface.

In addition, the second portion 44' of the first half-shell 41 and the second portion 44" of the second half-shell 42 as shown act together to form a frustoconical surface 45 suitable for coming into contact with said torsion box 50. For example, the frustoconical surface 45 is obtained with the help of a generator line extending from an ellipse and thus presenting sections that are elliptical.

Such a frustoconical surface serves to provide a frustoconical portion of a torsion box 50 and thereby facilitate attachment of an outer covering to such a frustoconical portion of the torsion box.

Furthermore, the first half-shell and the second half-shell as shown are symmetrical so that they act together to form a shell having the function of being a member for transmitting twisting forces to which the blade 1 is subjected.

Nevertheless, the first half-shell and second half-shell could be axisymmetrical.

Figure 5:
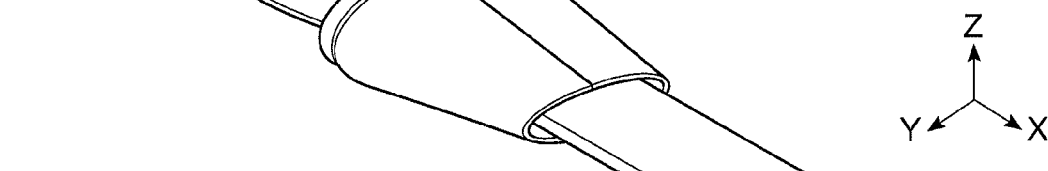

With reference to FIG. 5, when the transmission member is in place on the attachment zone 21 of the spar 20, a torsion box 50 is made around the second portion 44', 44" of each half-shell 41, 42 and the distal zone 22 of the spar 20.

Thereafter, fibers are draped or wound to extend in a direction that presents an acute angle with said longitudinal direction X1, e.g. an angle of 45 degrees.

The second portion may then be of small size insofar as said second portion serves mainly to take up the twisting forces of the blade.

Figure 6:
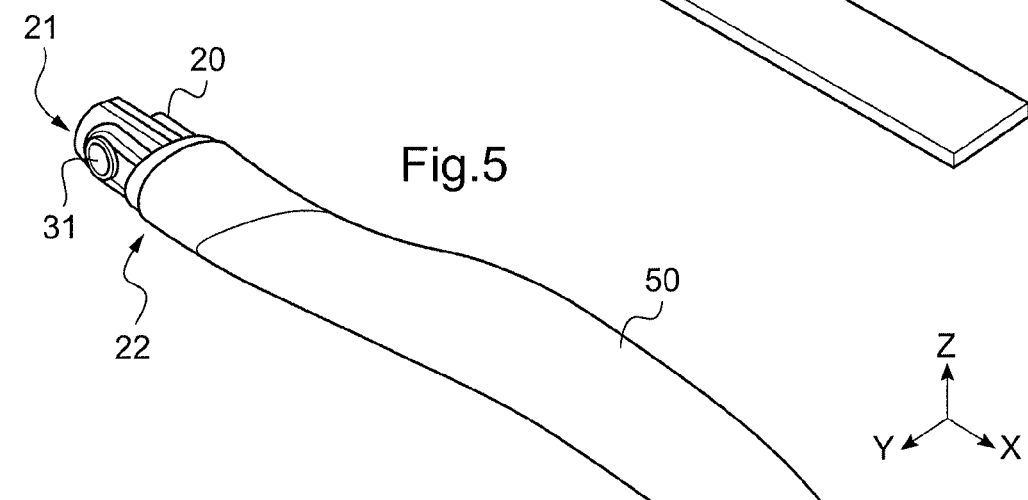

Under such circumstances, and with reference to FIG. 6, an outer covering 60 is made around the torsion box 50, e.g. by draping. Filler means 72 may optionally be arranged between the torsion box 50 and the outer covering 60.

After the covering has been made, the assembly comprising the spar 20, the transmission member 40, the torsion box 50, and the outer covering 60 is polymerized in order to finish off the airfoil element 10.

Finally, as shown in FIG. 7, the airfoil element 10 is inserted along arrow F1 into a fitting 2 and the fitting 2 is secured to the bushing 31 by a through pin 3 extending along arrow F2.

FIG. 8 is a section view of the blade 1.

In particular, this section view shows the attachment zone 21 of the spar 20 surrounding the centrifugal force transmission bushing 31 that is connected by a through pin to the fitting 2.

Furthermore, since the blade 1 has a twisting force transmission member 40 provided with a first half-shell 41 and a second half-shell 42 acting together to surround the attachment zone 21, FIG. 8 shows one or the other of these half-shells, e.g. the second half-shell. A filler member 71 is present between the spar 20 and the transmission member 40.

Each half-shell has a perforated first portion 43', 43" giving visual access to the bushing 31 and a second portion 44', 44" that co-operates with a torsion box 50 surrounding in particular the distal end 22 of the spar 20.

Said torsion box 50 is covered by filler means 72 and by an outer covering 60.

It should be observed that the second portions of the half-shells define a frustoconical contact surface 45 making contact with the torsion box 50, and extended at its largest section by a set-back surface 46 in order to enhance the retention of the outer covering on the torsion box by avoiding the outer covering being torn off under the effect of centrifugal forces.

With reference to FIG. 9, the transmission member 40 is secured to the fitting 2 in rotation about a torsion axis AX of the blade 1 by stop means 48, such as a flat 49 of the contact surface 47 that is defined by the first portions 43', 43" of the half-shells.

In another aspect, and with reference to FIG. 10, each section of the frustoconical surface 45 is optionally elliptical.

Furthermore, FIGS. 11 to 13 show a variant of the invention provided with a bayonet device for retaining the airfoil element 10 in the fitting 2.

Thus, each of the first portion 43' of the first half-shell 41 and the first portion 43" of the second half-shell 42 includes at least one fastener stud 200. Each stud projects from the associated half-shell.

Under such circumstances, the fitting 2 includes a longitudinal slideway 201 that opens out into one circularly arcuate slideway 202 per stud.

Consequently, in order to insert the airfoil element 10 into the fitting 2, the studs 200 are caused to slide in the associated longitudinal slideways 201 along arrow 210. When the studs 200 reach the circularly arcuate slideways 202, the fitting 2 is pivoted as shown by arrow 211 so as to bring holes 204 in the fitting 2 into coincidence with each end of the bushing 31.

With reference to FIG. 12, a through pin 3 then passes through the fitting 2 and the bushing 31, passing via said holes 204.

It should be observed that the through pin 3 may pass through a dedicated orifice in each of the half-shells 41, 42, as can be seen in FIG. 11. Nevertheless, it can be understood that clearance separates each half-shell from the bushing 31 and the through pin 3 so that centrifugal forces do not pass via the half-shells under normal conditions, i.e. so long as the through pin has not broken.

With reference to FIG. 13, each stud extends in a longitudinal direction over a predetermined length L1, and each circularly arcuate slideway 202 extends longitudinally over a length L2 that is greater than said predetermined length L1.

Consequently, the bushing 2 presents clearance 203 between each stud 200 and the associated circularly arcuate slideway 202.

The fitting 2 may then include a sensor suitable for detecting contact between a stud and faces 204, 205 of said fitting 2. Thus, breakage of the through pin 3 leads to such contact being made, which contact is then immediately detected and signaled by sensors provided for this purpose.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A blade provided with a fitting for fastening to a hub and with an airfoil element having a spar extending spanwise from an attachment zone towards a distal zone, the attachment zone surrounding a centrifugal force transmission bushing that is connected to the fitting by a through pin, wherein the blade includes a twisting force transmission member provided with a first half-shell and with a second half-shell that together surround the attachment zone, each half-shell having a perforated first portion giving visual access to the bushing when the airfoil element is removed from the fitting, and a second portion, the blade further including a torsion box surrounding the distal zone, the respective second portions of the first half-shell and the second half-shell co-operating with the torsion box, the transmission member being secured to the fitting in rotation about a torsion axis (AX) of the blade.

2. The blade according to claim 1, wherein the torsion box is placed around the distal zone of the spar, with an outer covering that covers the torsion box.

3. The blade according to claim 1, wherein filler means are arranged between the torsion box and an outer covering.

4. The blade according to claim 1, wherein a filler member is arranged between the spar and the transmission member.

5. The blade according to claim 1, wherein the first portion of the first half-shell and the second portion of the second half-shell together form a cylinder secured in rotation with the fitting.

6. The blade according to claim 1, wherein the first portion of the first half-shell and the first portion of the second half-shell act together to form a contact surface secured in rotation with the fitting by stop means.

7. The blade according to claim 6, wherein the stop means comprise a flat of the contact surface.

8. The blade according to claim 1, including assembly means for assembling the first half-shell to the second half-shell.

9. The blade according to claim 1, wherein the spar includes fibers extending in a longitudinal direction of the blade, the torsion box including fibers extending in a direction that presents an acute angle relative to the longitudinal direction.

10. A method of fabricating a blade according to claim 1, the method comprising the following steps:
fabricating a spar extending from an attachment zone towards a distal zone, the attachment zone surrounding a bushing, and then pre-polymerizing the spar;
arranging a twisting force transmission member provided with a first half-shell and a second half-shell on the attachment zone, each half-shell comprising a perforated first portion giving access to the bushing, and a second portion;
fabricating a torsion box around the second portion of each half-shell and the distal zone of the spar;
fabricating an outer covering around the torsion box and then polymerizing the assembly comprising the spar, the transmission member, the torsion box, and the outer covering in order to obtain an airfoil element; and
inserting the airfoil element in a fitting and connecting the fitting to the bushing by a through pin.

11. The blade according to claim 1, wherein the second portions of the half-shells are in contact with the torsion box.

12. The blade according to claim 11, wherein the torsion box is disposed on the second portions of the half-shells.

13. The blade of claim 1, wherein the torsion box extends about the respective second portions of the first half-shell and the second half-shell.

14. The blade of claim 1, wherein the blade includes only one torsion box.

15. A blade provided with a fitting for fastening to a hub and with an airfoil element having a spar extending spanwise from an attachment zone towards a distal zone, the attachment zone surrounding a centrifugal force transmission bushing that is connected to the fitting by a through pin, wherein the blade includes a twisting force transmission member provided with a first half-shell and with a second half-shell that together surround the attachment zone, each half-shell having a perforated first portion giving visual access to the bushing when the airfoil element is removed from the fitting, and a second portion co-operating with a torsion box surrounding the distal zone, the transmission member being secured to the fitting in rotation about a torsion axis (AX) of the blade, wherein the second portion of the first half-shell and the second portion of the second half-shell act together to form a frustoconical surface in contact with the torsion box.

16. The blade according to claim 15, wherein the frustoconical surface has elliptical sections.

17. The blade according to claim 15, wherein the torsion box is placed around the distal zone of the spar, with an outer covering that covers the torsion box, and wherein the spar includes fibers extending in a longitudinal direction of the blade, and the torsion box includes fibers extending in a direction that presents an acute angle relative to the longitudinal direction.

18. A blade provided with a fitting for fastening to a hub and with an airfoil element having a spar extending spanwise from an attachment zone towards a distal zone, the attachment zone surrounding a centrifugal force transmission bushing that is connected to the fitting by a through pin, wherein the blade includes a twisting force transmission member provided with a first half-shell and with a second half-shell that together surround the attachment zone, each half-shell having a perforated first portion giving visual access to the bushing when the airfoil element is removed from the fitting, and a second portion co-operating with a torsion box surrounding the distal zone, the transmission member being secured to the fitting in rotation about a torsion axis (AX) of the blade, wherein each of the first portion of the first half-shell and the first portion of the second half-shell includes a fastener stud, with the fitting having one longitudinal slideway and one circularly arcuate slideway per stud.

19. The blade according to claim 18, wherein each stud extends in a longitudinal direction over a predetermined length, and each circularly arcuate slideway extends longitudinally over a length that is longer than the predetermined length in order to present clearance when the stud is inserted in the circularly arcuate slideway.

20. The blade according to claim 18, wherein the torsion box is placed around the distal zone of the spar, with an outer covering that covers the torsion box.

* * * * *